United States Patent [19]

Bacon

[11] Patent Number: 4,584,153
[45] Date of Patent: Apr. 22, 1986

[54] BUTYL DISPENSING METHOD

[75] Inventor: Charles R. Bacon, Jackson, Mich.

[73] Assignee: Adco Products, Inc., Michigan Center, Mich.

[21] Appl. No.: 555,134

[22] Filed: Nov. 25, 1983

[51] Int. Cl.⁴ .............................................. B29C 47/10
[52] U.S. Cl. .................................... 264/169; 264/171; 264/176 R
[58] Field of Search ............... 222/146.1, 146.5, 146.6, 222/413; 264/37, 40.6, 40.7, 176 F, 169, 176 R, 171, 349, 28; 425/201, 206, 143

[56] References Cited

U.S. PATENT DOCUMENTS

| | | | |
|---|---|---|---|
| 1,608,980 | 11/1926 | Gordon | 425/206 |
| 2,105,881 | 1/1938 | Fether | 229/87 |
| 2,541,201 | 2/1951 | Buecken et al. | 264/176 R |
| 2,541,498 | 2/1951 | Calvert | 206/59 |
| 2,720,679 | 10/1955 | Ratliff | 264/176 R |
| 2,940,884 | 6/1960 | White | 154/53.5 |
| 3,183,288 | 5/1965 | Taylor et al. | 264/176 R |
| 3,344,218 | 9/1967 | Chopra et al. | 264/37 |
| 4,012,478 | 3/1977 | Horikawa et al. | 264/176 R |
| 4,178,337 | 12/1979 | Hall et al. | 264/28 |

FOREIGN PATENT DOCUMENTS 2940356  4/1981  Fed. Rep. of Germany ........ 264/37

*Primary Examiner*—Jay H. Woo
*Assistant Examiner*—J. Fortenberry
*Attorney, Agent, or Firm*—Beaman & Beaman

[57] ABSTRACT

The invention pertains to a system for dispensing tacky thermoplastic material such as butyl, and the like, and includes encasing a strip of the tacky material within a thin, non-tacky thermoplastic film capable of fluxing into the material at elevated temperatures wherein the material may be wound upon a spool for transportation and handling, and the material is fed from a spool into mixing and heating apparatus, preferably in the form of an extrusion gun, for application where desired as a bead.

1 Claim, 4 Drawing Figures

BUTYL DISPENSING METHOD

BACKGROUND OF THE INVENTION

Thermoplastic material, such as butyl rubber, is an excellent sealant and gasket, and is often used in such applications. However, due to the tacky nature of the material, handling, dispensing and shaping such material is very difficult. When tacky material in the form of sheets is laid upon themselves, or if in the form of a strip and wound upon a spool, the material "flows" together rendering separation and dispensing of the sheets or strips very difficult, if not impossible, and various techniques and apparatus have been employed to aid in the handling of such compositions.

A most common approach to improving the handling and separation of tacky material such as butyl has been to use a powder, such as talcum powder, to coat the surface of the material to render the same substantially non-tacky. While powdering the surface of the material does aid in the handling thereof, the shelf life of such powdered material is relatively short as the material will "bleed" through the powder, particularly at higher ambient temperatures, and it is not possible to accurately control the uniformity of powder distribution. Additionally, material treated with powder is troublesome to handle and creates unpleasant working conditions.

It has been proposed to improve the handling characteristics of tacky material in tape form by coating the tape with protective covering, such as shown in U.S. Pat. Nos. 2,105,881 and 2,940,884. Also, in U.S. Pat. No. 2,541,498 it has been proposed to utilize polyethylene film with tacky material to maintain the separation of sheets of tacky material, and this patent recognizes that the film may be compatible with the material for blending therewith.

OBJECTS OF THE INVENTION

It is an object of the invention to provide a dispensing system for tacky material, such as butyl, wherein the material may be handled and stored in long strips wound upon spools wherein adhesion of adjacent coils is prevented.

A further object of the invention is to provide a dispensing system for tacky material wherein elongated strips of thermoplastic tacky material are encased within thin thermoplastic film of non-tacky character whereby the material and film are chemically compatible and thermally integrable without adversely affecting the characteristics of the material.

Another object of the invention is to provide a method for dispensing tacky material wherein the material is encased within a thermoplastic film and the material and film are intermixed and heated to a thermoplastic temperature to produce a homogeneous mixture readily dispensable in a uniform bead or other controlled configuration.

A further object of the invention is to provide, as an article of manufacture, a strip of tacky material encased within a non-tacky film to permit ready handling, storage and dispensing of the material.

Yet an additional object of the invention is to provide combination mixing, heating and extrusion apparatus for tacky material encased within a film of thermoplastic non-tacky film chemically and thermally compatible with the material.

Another object is to provide a system for dispensing tacky material wherein the material is in the form of a strip wound upon a spool and the system utilizes a combination mixing and ejecting gun employing a spiral auger such that the auger functions to feed the strip of tacky material encased within a non-tacky film into the mixing chamber, mix the material and film and compress the mixture for ejection from a nozzle to form a bead of utilitarian configuration.

In the practice of the invention a thermoplastic tacky material, such as butyl, is tightly encased within a thin film of flexible non-tacky material, such as polyethylene. The film is of such density as to be impervious to seepage of the tacky material therethrough, and the film thermal characteristics are such that the film remains non-tacky at ambient temperatures normally encountered in warehouses, and the like, such as below 120° F. The encased tacky material is wound upon spools, and is processed in a dispensing "gun" which simultaneously feeds the strip into the gun, intermixes the tacky material and film, heats the mixture to a thermoplastic condition and compresses the same for ejection or extrusion through a nozzle to produce a bead for applying the mixture at the desired location.

The gun consists of a cylindrical tube defining a chamber in which a spiral auger rotates. The encased material enters the chamber at one end wherein the chamber is cooled to maintain the tensile strength of the strip, and the auger draws the encased strip into the mixing chamber. As the material moves through the chamber as pushed and kneaded by the auger, the material and film are intermixed, and adjacent the extrusion end of the chamber heating means heat the mixture to an elevated temperature to thoroughly "flux" or blend the film with the tacky material and lower the viscosity wherein ejection of the heated mixture through a nozzle in communication with the chamber produces a bead of desired dimension and cross section as produced by the form of the nozzle.

The practice of the invention eliminates previous problems in the handling of tacky material wherein the material is to be employed in the form of a bead, and the invention has particular advantages when using a tacky material such as butyl for sealing or gasket purposes wherein an accurately defined bead of material is desired.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
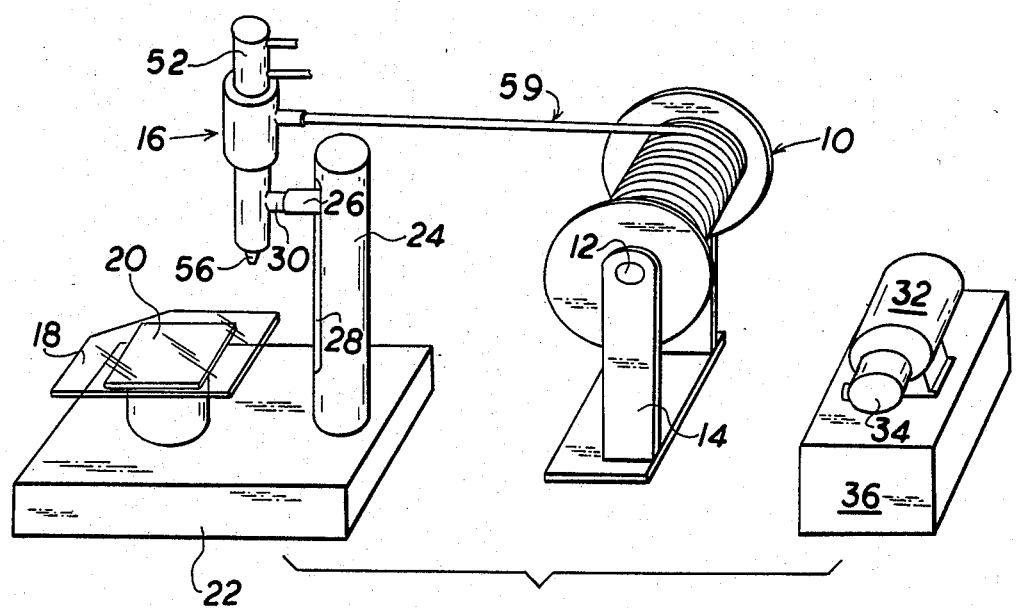
FIG. 1 is a perspective view of a schematic form of a typical tacky material dispensing system in accord with the invention.

In FIG. 1 the basic components of a tacky material dispensing system in accord with the invention are illustrated. The spool upon which the material is wound for storage and handling is represented at 10, and the spool is rotatably mounted upon axle 12 supported by brackets 14 attached to an appropriate base.

The dispensing apparatus basically consists of a "gun" 16, in which the tacky material is mixed, heated and formed into a usable bead, and in FIG. 1, the workpiece upon which the bead is to be applied is illustrated at 18 which is supported upon work table 20, mounted upon base 22. Base 22 supports column 24 from which projects the arm 26 through slot 28, and by means of mechanical apparatus, not shown, such as a screw or expansible motor, the arm 26 may be raised or lowered as desired. A telescoping tube 30 extends from the arm 26 and supports the gun 16, and by means of conventional mechanical apparatus the tube is telescopingly positionable within the arm. By a motor, not illustrated, the column 24 may be rotated and it will therefore be appreciated that by the rotation of the column, vertical movement of the arm 26 and the telescoping of the tube 30, that the gun 16 may be three dimensionally positioned relative to the workpiece, and by utilizing programmed or computerized controls for the gun support automatic movement of the gun relative to the workpiece is readily achieved.

The power for the illustrated support of the gun 16 is through a hydraulic system consisting of the motor 32 and pump 34 mounted upon the reservoir 36, as is well known. The hose lines between the hydraulic system and the gun positioning apparatus are omitted for clarity of illustration.

It is to be appreciated that the particular manner in which the gun 16 is supported forms no part of the present invention, and in some applications the gun may be stationarily located wherein the workpiece moves thereunder, and any means, automatic or manual, to support the gun in the desired relationship to the location of material application may be employed by those skilled in the art within the purview of the invention.

The gun 16 performs a plurality of functions. For instance, the gun serves as feeding means to draw the film encased tacky material into the mixing chamber defined within the gun, and additionally, the gun serves to heat the mixture of the tacky material and film to reduce the mixture viscosity and aid in the integration of the film into the material, and further, the gun includes the dispensing nozzle through which the heated mixture is extruded into a usable bead.

The gun includes an elongated tubular body 38 which defines a cylindrical chamber 40. At its right end, FIG. 2, the body is encased within a hollow jacket 42 having ports 44 communicating therewith whereby cooling water may be circulated through the jacket to cool the right end of the body and the material within the right end of the chamber. The jacket 42 includes an inlet 46 in alignment with the chamber inlet 48 whereby the tacky material may enter the chamber. Thus, the right end of the chamber 40 constitutes the tacky material receiving portion of the chamber.

Internally, the body 38 is provided with a helical auger 50 rotatably driven by a motor 52 extending from the jacket 42. The motor 52, in a commercial embodiment, is of the hydraulic type and is capable of rotating the auger at variable speeds to vary the rate of mixing and extrusion.

Figure 2:
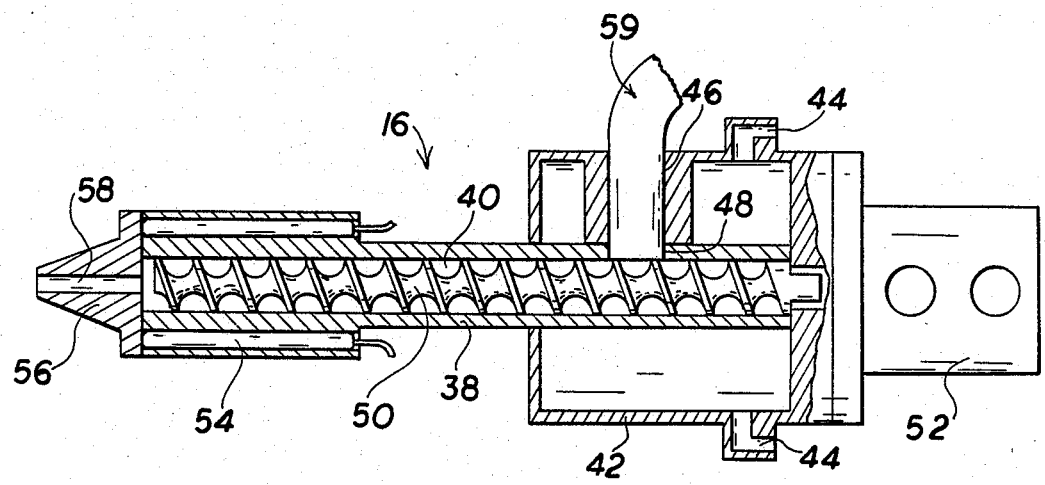
FIG. 2 is an elevational, diametrical, sectional view as taken through the mixing and extruding apparatus.

The left end of the chamber 40, FIG. 2, constitutes the discharge end for the chamber and electric heating elements 54 contact the body 38 to heat the left end of the body and the material within the chamber in alignment therewith. A nozzle or nose cone 56 encloses the left end of the body and is provided with a passage 58 in alignment with the chamber whereby the mixed material may be extruded through the nozzle passage as forced therethrough by the auger.

Figure 3:
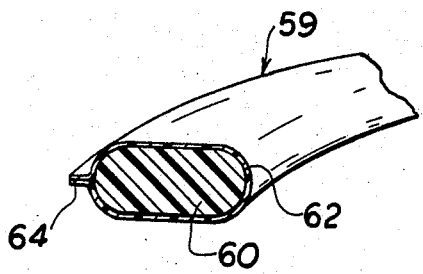
FIG. 3 is an elevational, sectional, perspective view of a strip of tacky material encased within a film in accord with the invention.
Figure 4:
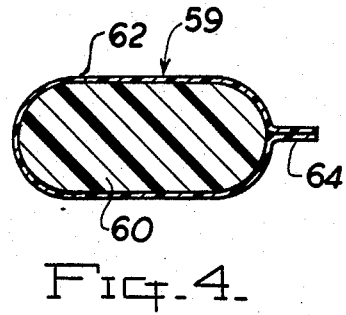
FIG. 4 is an elevational, right sectional view of the tacky material strip.

The tacky material being processed, such as butyl, is in the form of an elongated strip 59, and while the cross sectional dimensions of the strip may vary, a common commercial size for the strip is $\frac{3}{4}$" wide, and $\frac{3}{8}$" thick. The material 60 is encased within a film 62 of polyethylene, preferably of $\frac{1}{2}$ mil thickness, and as will be appreciated from FIGS. 3 and 4, the film tightly encases the material and is heat sealed at a seam 64. Of course, techniques can be utilized in the encasement of the material which would eliminate the seam 64, and the presence of the seam constitutes no part of the basic invention.

While, in the commercial embodiment $\frac{1}{2}$ mil polyethylene is utilized to encase the butyl material 60, it is to be appreciated that a variety of film compositions may be usable within the scope of the invention. The film must be of a flexible non-tacky material impervious to penetration by the tacky material 60 at ambient temperatures whereby the film will prevent adjacent strips of the tacky material from adhering together, even though the spooled encased material may be stored for long periods of time in warm climates and hot ambient conditions. Also, the material of the film 62 must be chemically compatible with the tacky material 60 so as not to chemically react therewith to adversely affect the tacky material for its intended purpose as a sealant. Thus, the preferred film material will be thermoplastic and capable of fluxing or integrating with the tacky material as the material is heated at the ejection end of the gun body 38, and as the mass of the film compared to that of the tacky material is much less, per unit of length, the integration of the film into the tacky material will not materially detract from the desired properties of the material.

In use, dispensing apparatus may be related as shown in FIG. 1, and the end of the tacky material strip 59 is fed into the jacket inlet 46 and into the chamber 40. Initially, the strip will have to be forced into the chamber by hand until the tacky material 60 is "gripped" by the auger 50 and begins to feed longitudinally to the left, FIG. 2, as the auger is rotated by the motor 52.

As the cooling jacket 42 will maintain the right end of the chamber 40 relatively cool, the motor 52 is protected from heat, and the material within the chamber adjacent inlet 48 is maintained at a nonelevated temperature wherein the viscosity and the tensile strength of the tacky material 60 is relatively high. Thus, the auger 50, due to the tension exerted on the strip 59 as the strip material is drawn into the auger, functions as means for feeding the strip into the chamber 40. Additionally, the film 62 has a given tensile strength which aids in pulling the encased material into the auger as the material moves through the chamber 40 toward the left, FIG. 2.

As the tacky material moves through the auger to the left, the film 62 will be torn and shredded, and mixed with the material 60, and as the material approaches the heated end of the chamber 40, the material temperature significantly rises decreasing the viscosity and melts the film 62 for total mixture with and integration into the tacky material. Thus, as the mixture is extruded through the nozzle 56 it will be of a heated state, the tacky material 60 and film 62 being homogeneously intermixed, and the lower viscosity of the mixture will form a bead as it leaves the nozzle which may be applied as desired for sealing purposes. By either movement of the gun, or the workpiece, the bead of mixture leaving the nozzle will be applied as intended.

From the above description it will be appreciated that as the gun 16 is self-feeding, heats the tacky material to a useful dispensable state, and mixes the tacky material with the protective film, a very practical system, at relatively low cost, is provided for dispensing tacky material such as butyl, which, previously, has been very difficult to store and dispense. The use of the film 62 permits the tacky material to be stored for long periods of time without adversely affecting the dispensing of the material from the spool, and the protective characteristics of the film reduce oxidation and reaction with the material with the atmosphere.

It is appreciated that various modifications to the inventive concepts within the scope of the invention may be apparent to those skilled in the art.

I claim:

1. The method of dispensing a thermoplastic material which is flexible and tacky at normal ambient temperatures comprising the steps of (a) circumferentially encasing an elongated strip of the tacky thermoplastic material within a thermoplastic flexible film which is non-tacky at normal ambient temperatures and chemically compatible with respect to said tacky material,
 (b) feeding said encased strip into an elongated mixing chamber having an encased strip receiving portion, a discharge portion axially spaced from the receiving portion and a rotating auger extending between said encased strip receiving and discharge portions,
 (c) cooling the chamber and encased strip at the encased strip receiving portion to increase the viscosity of the thermoplastic strip material thereat,
 (d) drawing said encased strip into the mixing chamber by the operation of the rotating auger,
 (e) mixing the tacky material and film within the chamber by the auger to form a mixture,
 (f) heating said chamber and material at said chamber discharge portion to an elevated temperature to facilitate mixture flow, and
 (g) discharging said heated mixture from a nozzle at said chamber discharge portion.

* * * * *